(12) United States Patent
Hegge et al.

(10) Patent No.: US 11,175,424 B2
(45) Date of Patent: Nov. 16, 2021

(54) SEISMIC DATA DE-BLENDING

(71) Applicant: Saudi Arabian Oil Company, Dhahran (SA)

(72) Inventors: Robertus F. Hegge, Rijswijk (NL); Rolf Baardman, Rotterdam (NL)

(73) Assignee: Saudi Arabian Oil Company, Dhahran (SA)

( * ) Notice: Subject to any disclaimer, the term of this patent is extended or adjusted under 35 U.S.C. 154(b) by 329 days.

(21) Appl. No.: 16/285,114

(22) Filed: Feb. 25, 2019

(65) Prior Publication Data
US 2020/0271805 A1    Aug. 27, 2020

(51) Int. Cl.
| | | |
|---|---|---|
| *G01V 1/36* | (2006.01) | |
| *G01V 1/38* | (2006.01) | |
| *G06K 9/62* | (2006.01) | |
| *G06N 3/08* | (2006.01) | |

(52) U.S. Cl.
CPC ............ *G01V 1/364* (2013.01); *G01V 1/3808* (2013.01); *G06K 9/6215* (2013.01); *G06N 3/08* (2013.01); *G01V 2210/57* (2013.01)

(58) Field of Classification Search
None
See application file for complete search history.

(56) References Cited

U.S. PATENT DOCUMENTS

| | | |
|---|---|---|
| 9,207,345 B2 | 12/2015 | Khalil et al. |
| 9,602,781 B2 | 3/2017 | Claussen et al. |
| 9,933,534 B2 | 4/2018 | Talaalout et al. |
| 9,945,972 B2 | 4/2018 | Baardman et al. |
| 9,966,088 B2 | 5/2018 | Mysore et al. |
| 10,036,820 B2 | 7/2018 | Can et al. |
| 10,083,354 B2 | 9/2018 | Aschenbeck |
| 2016/0245942 A1 | 8/2016 | Poole et al. |

(Continued)

OTHER PUBLICATIONS

Zhou et al. "Seismic Simultaneous Source Separation via Patchwise Sparse Representation", IEEE Transactions on Geoscience and Remote Sensing, vol. 54, No. 9, pp. 5271-5284, Sep. 2016 (Year: 2016).*

(Continued)

*Primary Examiner* — Roy Y Yi
(74) *Attorney, Agent, or Firm* — Fish & Richardson P.C.

(57) ABSTRACT

Methods, systems, and apparatus, including computer programs encoded on a computer storage medium, for training a seismic data de-blending model. In one aspect, a method comprises: obtaining a plurality of de-blending training examples, wherein each de-blending training example defines: (i) one or more blended seismic traces, and (ii) for each blended seismic trace, a corresponding plurality of target unblended seismic traces; using the de-blending training examples to train a de-blending model having a plurality of de-blending model parameters, comprising, for each de-blending training example: processing the one or more blended seismic traces of the training example using the de-blending model to generate an output which defines, for each of the one or more blended seismic traces of the training example, a corresponding plurality of estimated unblended seismic traces; and adjusting values of the plurality of de-blending model parameters.

19 Claims, 5 Drawing Sheets

(56) References Cited

U.S. PATENT DOCUMENTS

2017/0082761 A1* 3/2017 Li .................. G01V 1/368

OTHER PUBLICATIONS

Tariyal et al. "Deep Dictionary Learning," in IEEE Access, vol. 4, pp. 10096-10109, 2016 (Year: 2016).*
Araya-Polo et al., "Automated fault detection without seismic processing" The Leading Edge, Special Section: Data analytics and machine learning, Mar. 2017, 7 pages.
Baardman, "ML 11: Classification and Suppression of Blending Noise Using CNN," PES GB EAGE, First EAGE/PESGB Workshop on Machine Learning, Nov. 29-30, 2018, 3 pages.
Berkhout, "Changing the mindset in seismic data acquisition," Special Section: Seismic Acquisition, the Leading Edge, Jul. 2008, 11 pages.
Berkhout, "Seismic Migration: Imaging of Acoustic Energy by Wave Field Extrapolation, A Theoretical aspects," Second Revised and Enlarged Edition, Developments in Solid Earth Geophysics, 14A, 1982, 5 pages.
Mahdad et al., "Separation of blended data by iterative estimation and subtraction of blending interference noise," Geophysics, vol. 76, No. 3, May-Jun. 2011, 9 pages.

* cited by examiner

SEISMIC DATA DE-BLENDING

BACKGROUND

This specification relates to seismic data de-blending.

Seismic data can include seismic traces. A seismic trace refers to data characterizing a seismic signal that is recorded by a seismic receiver due to seismic waves generated by one or more seismic sources. Seismic traces can be generated during a geological survey by deploying an array of seismic sources (for example, air guns or seismic vibrators) and seismic receivers (for example, geophones) in or near a geological region. If the geological survey is land-based, the seismic sources and seismic receivers may be deployed on the surface of the geological region. If the geological survey is marine-based, the seismic sources and the seismic receivers may be towed in the water behind a survey vessel.

A blended seismic trace refers to a seismic trace that characterizes overlapping seismic signals recorded by a seismic receiver due to seismic waves generated by a set of two or more seismic sources. An unblended seismic trace refers to a seismic trace that characterizes a seismic signal recorded by a seismic receiver due to seismic waves generated by a single seismic source.

SUMMARY

This specification describes a system implemented as computer programs on one or more computers in one or more locations that de-blends seismic data.

According to a first aspect there is provided a method performed by one or more data processing apparatus for training a de-blending model having a set of de-blending model parameters. The method includes obtaining multiple de-blending training examples, where each de-blending training example defines: (i) one or more blended seismic traces, and (ii) for each blended seismic trace, a corresponding set of target unblended seismic traces. Each blended seismic trace characterizes overlapping seismic signals due to seismic waves generated by a corresponding set of seismic sources. Each seismic trace of the corresponding set of target unblended seismic traces characterizes a respective seismic signal due to seismic waves generated by a single seismic source of the corresponding set of seismic sources.

The de-blending training examples are used to train the de-blending model. For each de-blending training example, the one or more blended seismic traces of the training example are processed using the de-blending model to generate an output which defines, for each of the one or more blended seismic traces of the training example, a corresponding set of estimated unblended seismic traces. The values of the de-blending model parameters are adjusted based on: (i) the target unblended seismic traces of the training example, and (ii) the estimated unblended seismic traces generated by the de-blending model by processing the blended seismic traces of the training example.

In some implementations, obtaining the de-blending training examples includes performing a geological survey of a geological region to acquire the target unblended seismic traces of each of the de-blending training examples.

In some implementations, the method includes, for one or more training examples, generating the blended seismic traces of the training example by numerically blending the corresponding set of target unblended seismic traces of the training example.

In some implementations, the blended seismic traces of each training example are represented as a blended shot record, and the target unblended seismic traces of each training example are represented as respective target unblended shot records.

In some implementations, each training example further includes, for each blended seismic trace, data characterizing properties of the corresponding set of seismic sources.

In some implementations, processing the one or more blended seismic traces of the training example using the de-blending model includes processing, for each blended seismic trace, the data characterizing the properties of the corresponding set of seismic sources using the de-blending model.

In some implementations, the properties of the corresponding set of seismic sources includes one or more of: respective activation strengths of each seismic source of the corresponding set of seismic sources, respective spatial positions of each seismic source of the corresponding set of seismic sources, and relative activation times of each seismic source of the corresponding set of seismic sources.

In some implementations, the de-blending model includes a neural network.

In some implementations, the neural network is a convolutional neural network.

In some implementations, adjusting the values of the set of de-blending model parameters includes determining a similarity measure between the target unblended seismic traces of the training example and the estimated unblended seismic traces generated by the de-blending model by processing the blended seismic traces of the training example. The values of the plurality of de-blending model parameters are adjusted based at least in part on the similarity measure.

In some implementations, adjusting the values of the set of de-blending model parameters based at least in part on the similarity measure includes determining a gradient of a loss function that depends on the similarity measure, and using the gradient to adjust the values of the plurality of de-blending model parameters.

In some implementations, the de-blending model is trained during a first portion of a geological survey that includes obtaining the target unblended seismic traces of the set of de-blending training examples.

In some implementations, training the de-blending model further includes determining that a training termination criterion is satisfied. After the training termination criterion is satisfied, the geological survey acquires only blended seismic traces.

According to a second aspect, there is provided a system including one or more computers and one or more storage devices communicatively coupled to the one or more computers. The one or more storage devices store instructions that, when executed by the one or more computers, cause the one or more computers to perform the operations described in the first aspect.

According to a third aspect, there is provided one or more non-transitory computer storage media storing instructions that when executed by one or more computers cause the one or more computers to perform the operations described in the first aspect.

Particular embodiments of the subject matter described in this specification can be implemented so as to realize one or more of the following advantages.

The de-blending system described in this specification can be trained to de-blend seismic data using machine learning training techniques. After the de-blending system is trained, a user of the de-blending system is required to perform little (if any) parameter tuning during operation of the de-blending system. In contrast, for some conventional de-blending systems, users may be required to spend a considerable amount of time testing the effects of various parameter settings on the de-blending results to determine appropriate settings for the various parameters. Moreover, by obviating the need for users to hand-tune parameter settings using heuristic techniques, the de-blending system described in this specification may produce de-blending results that are more consistent than some conventional de-blending systems.

The details of one or more embodiments of the subject matter of this specification are set forth in the accompanying drawings and the description provided. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
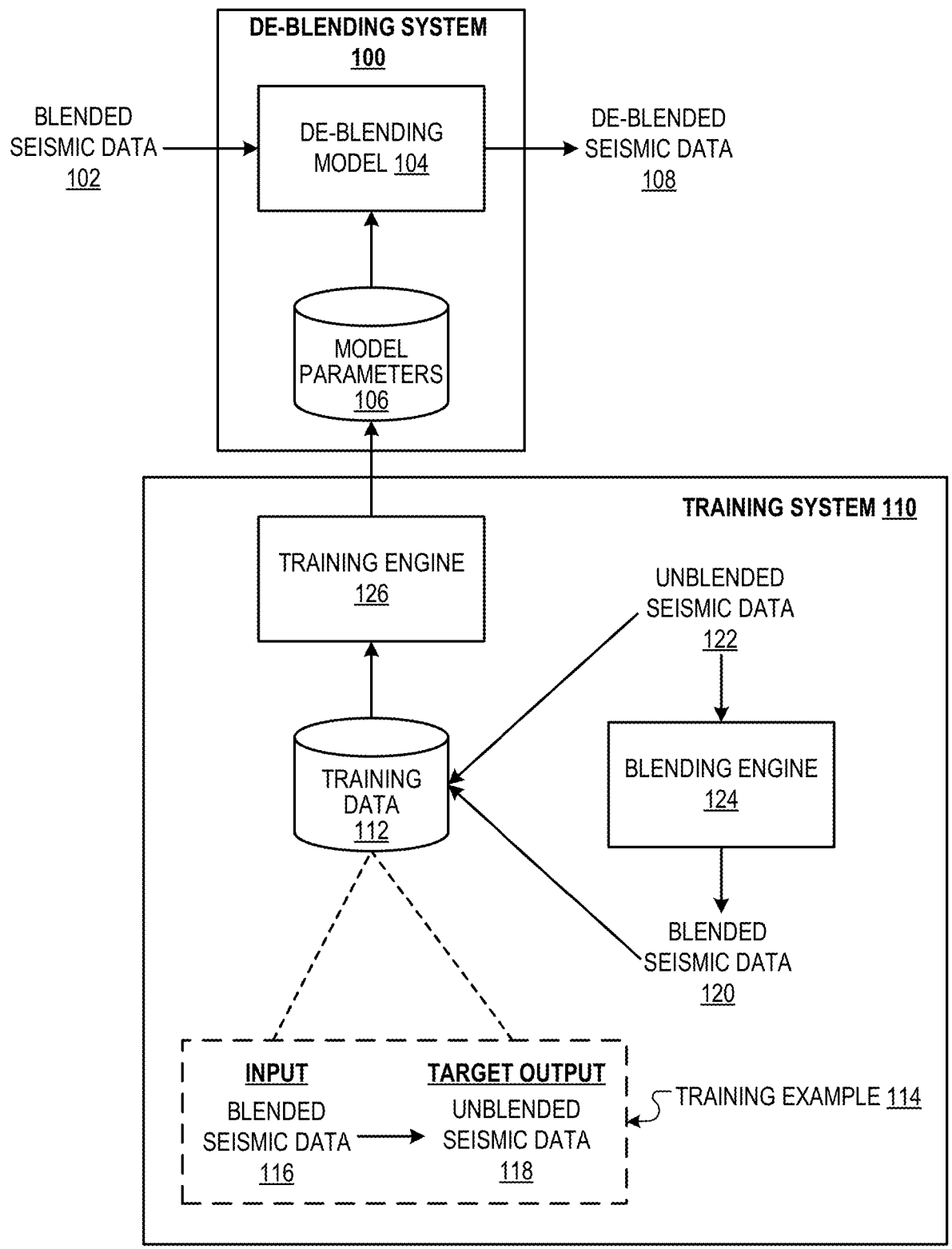
FIG. 1 is a shows an example de-blending system.

FIG. 1 shows an example de-blending system 100. The de-blending system 100 is an example of a system implemented as computer programs on one or more computers in one or more locations in which the systems, components, and techniques described in this specification are implemented.

The de-blending system 100 is configured to process blended seismic data 102 using a de-blending model 104, in accordance with the values of a set of de-blending model parameters 106, to generate corresponding de-blended seismic data 108. The blended seismic data 102 processed by the de-blending system 100 includes one or more blended seismic traces. The de-blended seismic data 108 generated by the de-blending system 100 includes a corresponding set of estimated unblended seismic traces for each blended seismic trace included in the blended seismic data 102. As will be described in more detail later, the training system 110 can train the de-blending system 100 using seismic data acquired during a geological survey of a geological region to perform de-blending of blended seismic data characterizing the geological region.

A seismic trace refers to data characterizing a seismic signal that is recorded by a seismic receiver due to seismic waves generated by one or more seismic sources. A seismic source can generate a seismic wave which is transmitted into the interior of the geological region and reflected from a reflection surface in the interior of the geological region. A seismic signal characterizing the reflected seismic wave can be recorded at a seismic receiver, thereby generating a seismic trace. A seismic trace generated by a seismic receiver can be represented as a vector, where each component of the vector represents the magnitude of the seismic signal that is recorded by the seismic receiver at a respective time point.

A "blended" seismic trace refers to a seismic trace that characterizes overlapping seismic signals that are recorded by a seismic receiver due to seismic waves generated by a set of two or more seismic sources. The set of seismic sources are activated within a sufficiently small time delay and sufficiently close in space that seismic signals characterizing the reflections of the seismic waves generated by the seismic sources are simultaneously recorded by the seismic receiver.

An "unblended" seismic trace refers to a seismic trace that characterizes a seismic signal recorded by a seismic receiver due to seismic waves generated by a single seismic source. In some cases, a seismic trace that characterizes overlapping seismic signals due to seismic waves generated by multiple seismic sources may be considered to be unblended if the seismic signal generated due to one of the seismic sources largely dominates the seismic signals generated due to the other seismic sources.

Each blended seismic trace included in the blended seismic data 102 characterizes overlapping seismic signals due to seismic waves generated by a set of two or more seismic sources. For each blended seismic trace included in the blended seismic data 102, the de-blended seismic data 108 includes two or more unblended seismic traces which each characterize a respective seismic signal due to seismic waves generated by a respective seismic source from the set of seismic sources.

The de-blending model 104 can be implemented as any appropriate model that has a set of trainable model parameters 106 and that can be configured to process blended seismic data 102 to generate corresponding de-blended seismic data 108. For example, the de-blending model 104 can be implemented by a neural network having model parameters that define the weights (and other parameters) of the neural network. The neural network can have any appropriate neural network architecture, for example, a convolutional neural network architecture. A neural network is said to have a convolutional neural network architecture if the neural network includes one or more convolutional neural network layers.

The training system 110 is configured to train the de-blending system 100 based on a set of training data 112 by determining the values of the model parameters 106 of the de-blending model 104. For example, the training system 110 may determine the values of the model parameters 106 by using a training engine 126 to iteratively adjust the values of the model parameters 106 at each of multiple training iterations. An example process for training a de-blending system 100 is described with reference to FIG. 4.

The training data 112 includes multiple training examples, for example, the training example 114. Each training example includes: (i) blended seismic data 116, and (ii) corresponding unblended seismic data 118. The blended seismic data 116 includes one or more blended seismic traces, and for each blended seismic trace, the unblended seismic data 118 includes a corresponding set of "target" unblended seismic traces. The unblended seismic data 118 of each training example defines the output that should be generated by the de-blending system 100 in response to processing the blended seismic data 116 of the training example.

The training system 110 can generate the training data 112 based on seismic data acquired during a geological survey of a geological region. Unblended seismic data may be acquired during the geological survey by activating different seismic sources over non-overlapping time intervals and recording seismic signals due to the reflections of the resulting seismic waves as respective seismic traces at each of one or more seismic receivers. The non-overlapping time intervals may be separated by sufficiently long periods of time that the seismic signal generated due to the seismic source activated during any given time interval largely dominates any residual seismic signals generated due to the seismic sources that were not activated during the given time interval. The blended seismic data of the training examples can be obtained in any of a variety of ways. A couple of examples follow.

In some implementations, the training system 110 generates the blended seismic data 120 included in a training example by processing unblended seismic data 122 acquired during the geological survey using a blending engine 124. The blended seismic data 120 represents seismic data that would have been recorded by seismic receivers if the seismic sources of the unblended seismic data 122 had been activated within a time delay (that is, a "sufficiently small" time delay) and within a distance from the seismic receivers (that is, "sufficiently close in space" to the seismic receivers) which resulted in blended seismic traces being recorded. The training system 110 can thereafter generate a training example which includes: (i) the unblended seismic data 122, and (ii) the blended seismic data 120 generated by processing the unblended seismic data 122 using the blending engine 124.

In some implementations, the training system 110 obtains the blended seismic data included in a training example during the geological survey. For example, during the geological survey, a set of multiple seismic sources may be activated over non-overlapping time intervals and the seismic signals generated due to the reflections of the resulting seismic waves may be recorded as unblended seismic traces at each of one or more receivers. Thereafter, the multiple seismic sources may be activated within a sufficiently small time delay and sufficiently close in space (that is, to the one or more receivers) to cause the seismic signals due to the reflections of the resulting seismic waves to be recorded as a blended seismic trace at each of the one or more receivers. The training system 110 can generate a training example which includes: (i) the unblended seismic data and (ii) the corresponding blended seismic data acquired during the geological survey. Alternatively or in combination, a proper set of the multiple seismic sources may be activated within a sufficiently small time delay and sufficiently close in space to cause blended traces to be recorded at each of the one or more receivers. In this case, the training system 110 can generate a training example which includes: (i) the unblended seismic data corresponding to the proper subset of the seismic sources and (ii) the corresponding blended seismic data corresponding to the proper subset of the seismic sources.

The training system 110 can also generate training data 112 based on blended seismic data acquired during the geological survey, even in cases where corresponding unblended seismic data was not acquired during the geological survey. For example, the training system 110 can process a set of blended seismic data acquired during the geological survey using a conventional de-blending system (which requires manual human supervision to test the effects of various parameter settings) to generate corresponding unblended seismic data. The training system can thereafter generating a training example which includes: (i) the unblended seismic data generated using a conventional de-blending system (under manual human supervision), and (ii) the corresponding blended seismic data acquired during the geological survey.

A geological survey may be designed with the intention of generating seismic data which can be used to generate training data 112 that enables the training system 110 to effectively train the de-blending system 100. For example, during the geological survey, unblended seismic data may be acquired using seismic sources and seismic receivers at spatial positions that are distributed throughout the geological region. In this example, the collection of unblended seismic data acquired during the geological survey will be representative of the geological structure of the entirety of the geological region, thereby enabling the trained de-blending system 100 to effectively de-blend seismic data acquired anywhere in the geological region.

The training system 110 may train the de-blending system 100 during (that is, concurrently with) the geological survey by generating training data 112 from seismic data as it is generated during the geological survey. When the training system 110 determines that the de-blending system 100 has been trained to achieve an acceptable prediction accuracy, the training system 110 may refrain from further training of the de-blending system and the geological survey may transition to acquiring only blended seismic data. The training system 110 may determine that an "acceptable prediction accuracy" has been achieved when the prediction accuracy of the de-blending system 100 meets a predetermined threshold value. The prediction accuracy of the de-blending system 100 may be defined in any appropriate manner. For example, the prediction accuracy may be defined as the fraction of the training examples in the training data 112 for which a measure of similarity between the target unblended seismic traces of the training example and the corresponding estimated unblended seismic traces generated by the de-blending system 100 exceeds a predetermined threshold. Alternatively, the training system 110 may train the de-blending system 100 after the geological survey is complete, using training data 112 derived from seismic data acquired during the geological survey.

Independently of whether the de-blending system 100 is trained during or after the geological survey, the trained de-blending system 100 can be used to process any amount of blended seismic data characterizing the geological region to generate corresponding de-blended seismic data. The de-blended seismic data generated by the de-blending system 100 can be used to characterize the geological region in any appropriate manner. For example, the de-blended seismic data generated by the de-blending system 100 can be used to generate a velocity model of the geological region which characterizes the subsurface velocities of seismic waves travelling through different spatial positions in the geological region. As another example, the de-blended seismic data generated by the de-blending system 100 can be used to generate a structural model of the geological region which characterizes the sub-surface geometry of geological structures (for example, rock layers) in the geological region.

The model parameters 106 of the de-blending system 100 can be initialized in any appropriate manner prior to being trained by the training system 110. For example, the model parameters 106 may be initialized to random values drawn from one or more predetermined probability distributions. As another example, the model parameters 106 may be initialized to model parameter values that were previously determined by training the de-blending system 100 on seismic data acquired from a different geological region (for example, a geological region adjacent to the present geological region).

Figure 2:
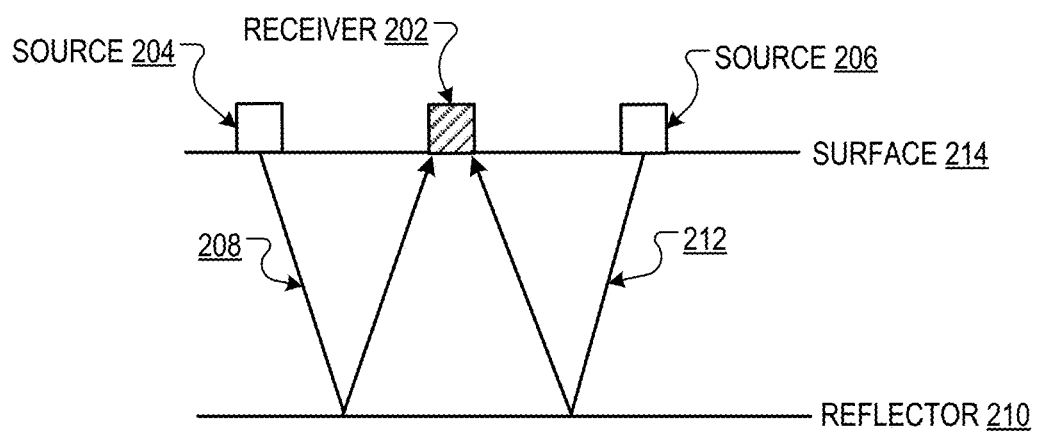
FIG. 2 illustrates a seismic receiver and two seismic sources.

FIG. 2 illustrates a seismic receiver (202) and two seismic sources (204 and 206) on the surface 214 of a geological region. The seismic source 204 transmits a seismic wave 208 which reflects from the reflector 210 and is received and recorded as a seismic signal by the receiver 202. The seismic source 206 transmits a seismic wave 212 which reflects from the reflector 210 and is received and recorded as a seismic signal by the receiver 202. The seismic sources 204 and 206 may be activated over non-overlapping intervals of time which result in the receiver 202 recording a respective unblended seismic trace corresponding to each of the seismic sources 204 and 206. If the seismic sources 204 and 206 are activated within a sufficiently small time delay and sufficiently close in space that seismic signals characterizing reflections of the seismic waves 208 and 210 are simultaneously recorded by the seismic receiver 202, then the receiver 202 may record a single blended trace.

Figure 3:
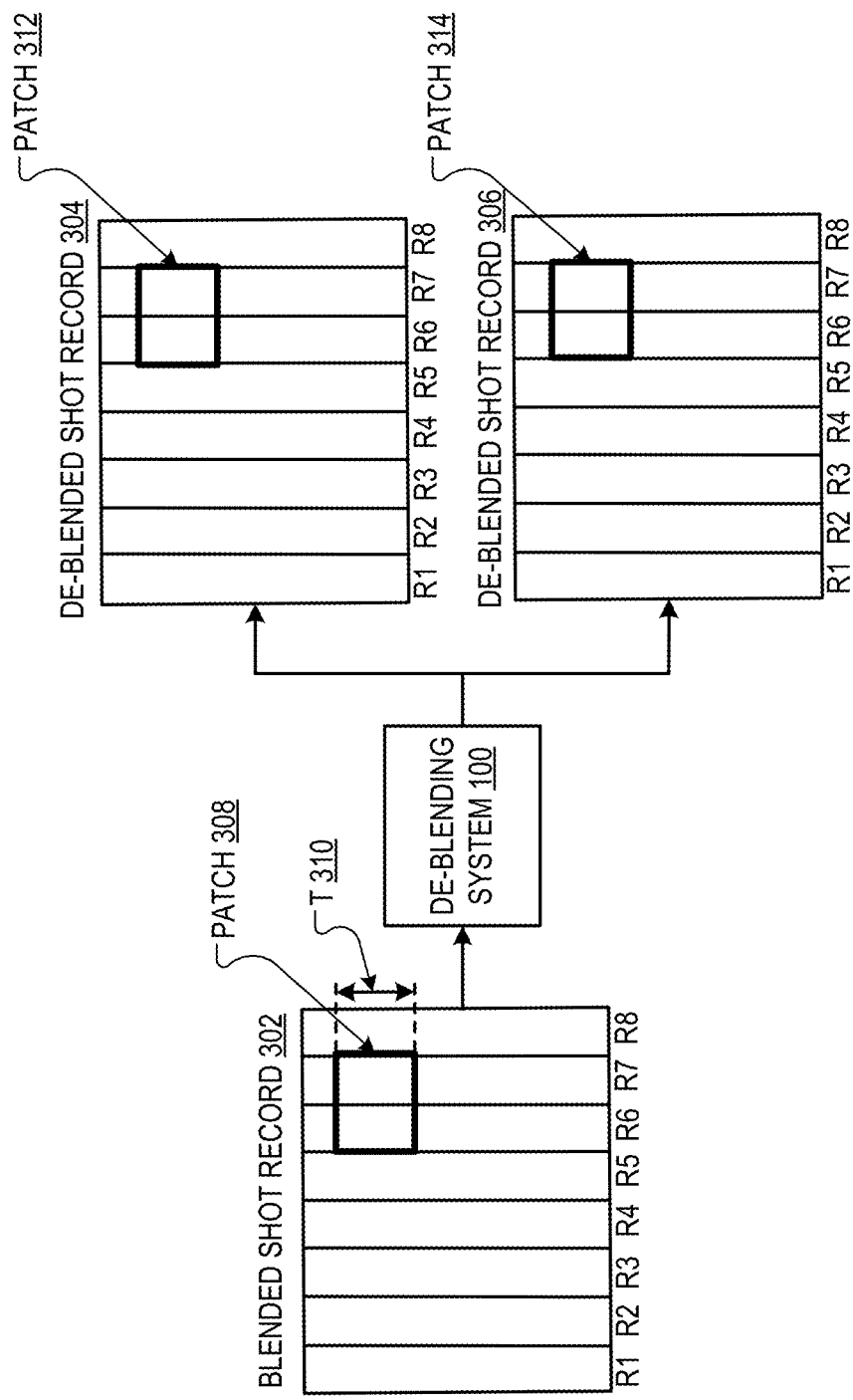
FIG. 3 illustrates an example of the de-blending system processing a blended shot record to generate two corresponding de-blended shot records.

FIG. 3 illustrates an example of the de-blending system 100 processing a blended shot record 302 to generate two corresponding de-blended shot records 304 and 306. A shot record refers to a set of seismic traces that are recorded by one or more seismic receivers due to seismic waves generated by one or more seismic sources over a given interval of time. In this example, the blended shot record 302 includes respective blended traces recorded by 8 receivers (that is, R1, R2, . . . , R8). Each of the blended traces in the blended shot record 302 is represented as a respective (column) vector of numerical values that is indexed by a time coordinate. Each of the blended traces characterizes the magnitude of the seismic signal recorded by the seismic receiver corresponding to the blended trace at each of multiple time points. In this example, the blended shot record 302 is represented as a two-dimensional (2D) matrix of numerical values.

The de-blended shot records 304 and 306 generated by the de-blending system 100 each correspond to a respective seismic source. More specifically, the de-blended shot record 304 includes respective unblended seismic traces corresponding to the 8 receivers (that is, R1, R2, . . . , R8) which each characterize a seismic signal recorded by a respective seismic receiver due to seismic waves generated by a first seismic source. Similarly, the de-blended shot record 306 includes respective unblended seismic traces corresponding to the 8 receivers (that is, R1, R2, . . . , R8) which each characterize a seismic signal recorded by a respective seismic receiver due to seismic waves generated by a second seismic source. In this example, each of the de-blended shot records 304 and 306 is represented as a respective 2D matrix of numerical values.

The de-blending system 100 may include a de-blending model that is implemented as a convolutional neural network. In the example depicted in FIG. 3, the input layer of the convolutional neural network may be configured to receive the 2D matrix representing the blended shot record. The output layer of the convolutional neural network may be configured to output the respective de-blended shot records 304 and 306. More specifically, the output layer of the convolutional neural network may include a respective neuron corresponding to each of the components of the 2D matrices representing the de-blended shot records 304 and 306. The activation value of a neuron in the output layer of the convolutional neural network may indicate the predicted value of the component of the de-blended shot record matrix corresponding to the neuron.

In some cases, the de-blending model of the de-blending system 100 may be configured to process "patches" of blended seismic data to generate corresponding "patches" of de-blended seismic data. A patch of seismic data refers to a predetermined amount of seismic data, for example, shot record data corresponding to seismic traces recorded over a predetermined length of time by a predetermined number of seismic receivers. The patch 308 illustrates a patch of blended shot record data, corresponding to seismic traces recorded over the length of time T 310 by two seismic receivers (specifically, the seismic receivers R6 and R7). The patches 312 and 314 illustrate corresponding patches of de-blended shot record data that may be generated by the de-blending model by processing the patch 308 of blended shot record data. The patches 312 and 314 correspond to seismic traces recorded over the length of time T 310 by seismic receivers R6 and R7 which characterize seismic signals recorded due to seismic waves generated by the first and second seismic sources respectively.

The de-blending system 100 may process blended seismic data (for example, the blended shot record 302) by partitioning the blended seismic data into a set of patches, and processing each of the patches using the de-blending model to generate corresponding patches of de-blended seismic data. Thereafter, the de-blending system 100 can reconstruct full sets of de-blended seismic data by combining the patches of de-blended seismic data. In a particular example, the de-blending system 100 may partition a blended shot record into a set of non-overlapping patches, and process each of the non-overlapping patches using the de-blending model to generate corresponding non-overlapping patches of de-blended seismic data. In this example, the de-blending system 100 can reconstruct the de-blended shot record corresponding to a respective seismic source by spatially concatenating the non-overlapping patches of de-blended seismic data corresponding to the respective seismic source.

Figure 4:
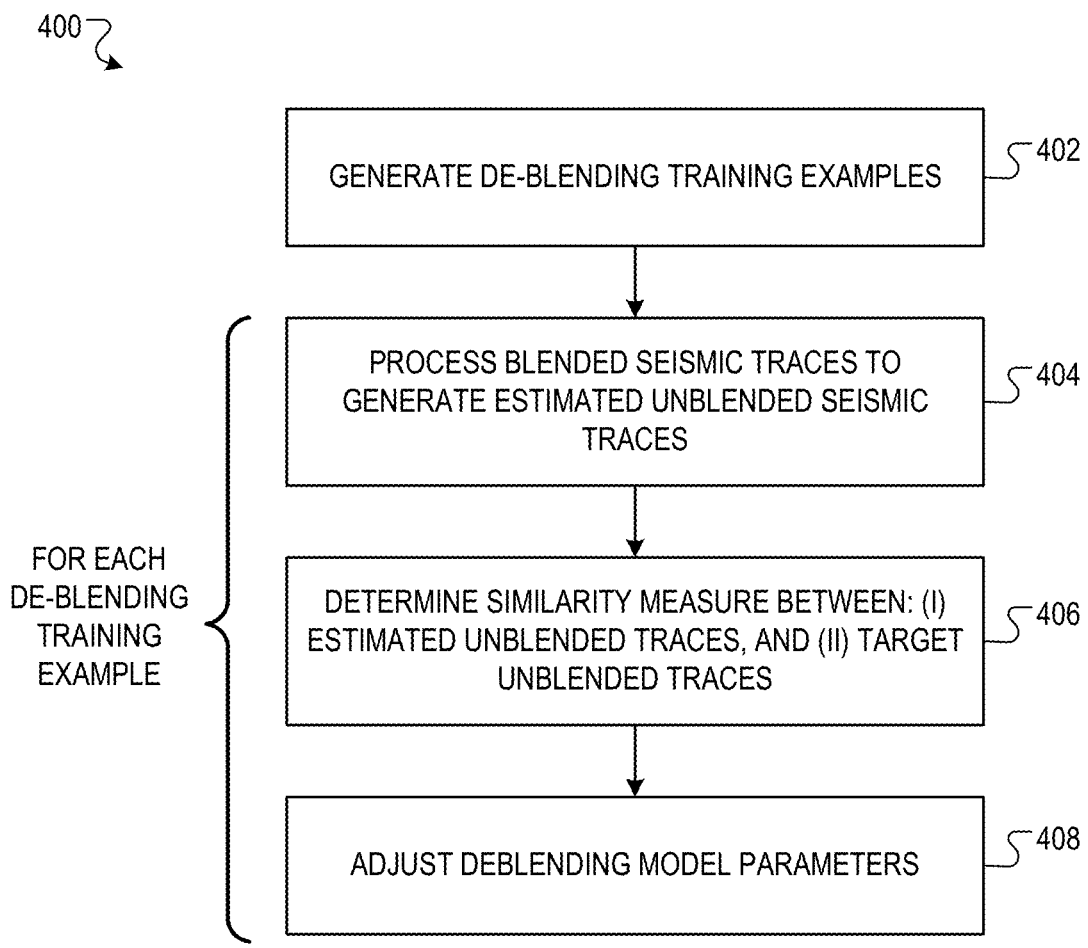
FIG. 4 is a flow diagram of an example process for training a de-blending system.

FIG. 4 is a flow diagram of an example process 400 for training a de-blending system. For convenience, the process 400 will be described as being performed by a system of one or more computers located in one or more locations. For example, a training system, for example, the training system 110 of FIG. 1, appropriately programmed in accordance with this specification, can perform the process 400.

The system generates de-blending training examples from seismic data acquired during a seismic survey of a geological region (402). Each training example defines: (i) one or more blended seismic traces, and (ii) for each blended seismic trace, a corresponding set of multiple target unblended seismic traces. The target unblended seismic traces of the training example define the output that should be generated by the de-blending system in response to processing the blended seismic traces of the training example.

The target unblended seismic traces included in each training example may be acquired during the geological survey. That is, the unblended seismic traces included in each training example may each be generated by a respective seismic receiver in the geological region and characterize a seismic signal corresponding to a seismic wave generated by a single seismic source. In some cases, the unblended seismic traces characterize seismic signals corresponding to seismic waves generated by multiple seismic sources, where the seismic signal corresponding to one of the seismic sources dominates and the remaining seismic signals corresponding to the other seismic sources are considered negligible relative to the dominant seismic signal. For example, the dominant seismic signal may correspond to a seismic source that is closer to the seismic receivers than the remaining seismic sources. Alternatively or in combination, the system may generate the target unblended seismic traces included in a training example by processing blended seismic data acquired during the geological survey using a conventional de-blending system (under manual human supervision).

The system may generate the blended seismic trace of a training example by processing the corresponding set of unblended seismic traces of the training example using a numerical blending method. For example, the numerical blending method may generate the blended seismic trace as a linear combination of the set of unblended seismic traces, where the weights of the linear combination are determined based on the spatial positions, activation strengths, relative activation times, or a combination thereof, of the seismic sources corresponding to the unblended seismic traces. The relative activation times of the seismic sources refer to the time delays between when respective seismic sources are activated. An example of a numerical blending method is described with reference to: A. J. Berkhout, "Changing the mindset in seismic data acquisition", The Leading Edge, 27(7), 924-938, (2008). Alternatively or in combination, rather than numerically generating the blended seismic traces from the unblended seismic traces, the blended seismic traces may be acquired during the geological survey.

The blended seismic traces and the target unblended seismic traces of the training examples may be represented in any appropriate manner. For example, the blended seismic traces may be represented as a shot record recorded by one or more seismic receivers while two or more seismic sources are simultaneously activated. In this example, the target unblended training examples may be represented by a respective shot record corresponding to each of the two or more seismic sources. As another example, the blended seismic traces may be represented in a common receiver domain. In this example, each of the blended seismic traces defines a recording by the same given seismic receiver of seismic signals generated by a respective combination of two or more seismic sources. Each target unblended seismic trace corresponding to a blended seismic trace represents the recording by the given receiver of the seismic signal generated by a particular seismic source.

In some cases, each training example includes additional data pertaining to the seismic sources corresponding to each of the blended seismic traces. For example, each training example may include additional data that characterizes the activation strengths, relative spatial positions, relative activation times, or a combination thereof, of the seismic sources corresponding to each of the blended seismic traces.

Steps 404-408 describe operations to be performed for each of the generated de-blending training examples during training of the de-blending system. In general, the system can use any appropriate machine learning training technique to train the de-blending system based on the de-blending training examples. For example, the system can use a stochastic gradient descent procedure, where the steps 404-408 are iteratively performed for "batches" (that is, sets) of de-blending training examples at each of multiple training iterations. In this example, at each training iteration, the system may determine whether a training termination criterion is met. For example, the system may determine that a training termination criterion is met if a predetermined number of training iterations have been performed. As another example, the system may determine that a training termination criterion is met if a change in the prediction accuracy of the de-blending system between training iterations is less than a predetermined threshold. As another example, the system may determine that a training termination criterion is met if the prediction accuracy of the de-blending system satisfies a predetermined threshold. In response to determining that the training termination criterion is not met, the system may perform another training iteration. In response to determining that the training termination criterion is met, the system may output the trained parameter values of the de-blending model.

The system processes the blended seismic traces of the training example using the de-blending model (in accordance with the current values of the de-blending model parameters) to generate a corresponding set of estimated unblended seismic traces for each of the blended seismic traces (404). For example, the system may process a blended shot record to generate a corresponding set of multiple estimated unblended shot records. In some cases, the de-blending model may process additional data included in the training example which pertains to the seismic sources corresponding to each of the blended seismic traces. For example, the de-blending model may process additional data that characterizes the activation strengths, relative spatial positions, absolute or relative activation times, or a combination thereof, of the seismic sources corresponding to each of the blended seismic traces.

The system determines a similarity measure between: (i) the target unblended seismic traces of the training example, and (ii) the estimated unblended seismic traces generated by the de-blending system by processing the blended seismic traces of the training example (406). For example, the system may determine the similarity measure as a Euclidean norm of the difference between the target unblended seismic traces and the estimated unblended seismic traces. As another example, the system may determine the similarity measure as Huber norm of the difference between the target unblended seismic traces and the estimated unblended seismic traces.

The system adjusts the current values of the de-blending model parameters based on the similarity measure between the target unblended seismic traces and the estimated unblended seismic traces (408). For example, when the de-blending model is implemented as a neural network, the system may determine a gradient of a loss function that depends on the similarity measure with respect to the parameters of the de-blending model. In a particular example, the loss function may be given by the similarity measure between the target unblended seismic traces and the estimated unblended seismic traces. The system can determine the gradient of the loss function using any appropriate numerical technique, for example, backpropagation. The system may use the gradient of the loss function to adjust the current values of the de-blending model parameters in accordance with any appropriate gradient descent update rule, for example, the update rule of an Adam or RMSprop gradient descent optimization algorithm.

Figure 5:
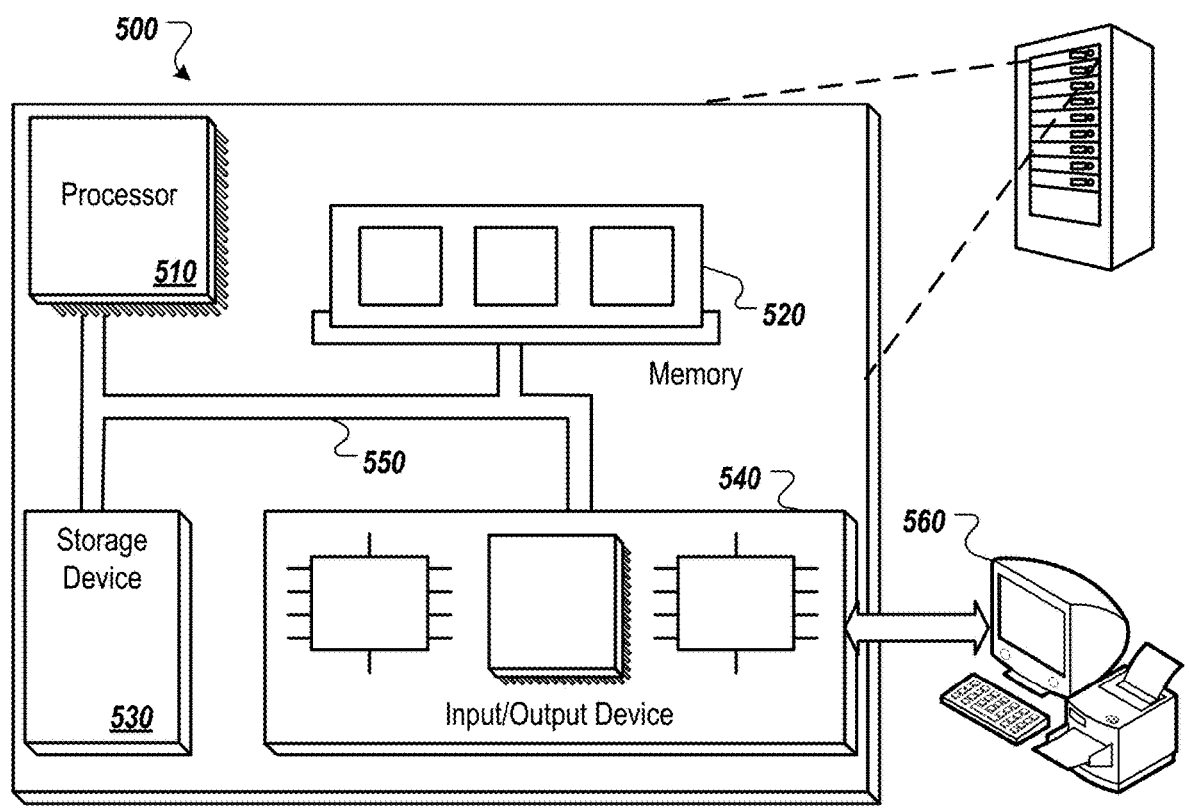
FIG. 5 is block diagram of an example computer system.

FIG. 5 is a block diagram of an example computer system 500 that can be used to perform operations described previously. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (for example, a cloud storage device), or some other large capacity storage device.

The input/output device 540 provides input/output operations for the system 500. In one implementation, the input/output device 540 can include one or more network interface devices, for example, an Ethernet card, a serial communication device, for example, and RS-232 port, and/or a wireless interface device, for example, and 802.11 card. In another implementation, the input/output device 540 can include driver devices configured to receive input data and send output data to other input/output devices, for example, keyboard, printer and display devices 560. Other implementations, however, can also be used, such as mobile computing devices, mobile communication devices, and set-top box television client devices.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, that is, one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, for example, an FPGA (field programmable gate array) or an ASIC (application-specific integrated circuit). The apparatus can optionally include, in addition to hardware, code that creates an execution environment for computer programs, for example, code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages. A program can be deployed in any form, including as a stand-alone program or as a module, component, subroutine, or other unit suitable for use in a computing environment. A program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, for example, an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few.

Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, for example, a smartphone that is running a messaging application, and receiving responsive messages from the user in return.

Data processing apparatus for implementing machine learning models can also include, for example, special-purpose hardware accelerator units for processing common and compute-intensive parts of machine learning training or production, that is, inference, workloads.

Machine learning models can be implemented and deployed using a machine learning framework, for example, a TensorFlow framework, a Microsoft Cognitive Toolkit framework, an Apache Singa framework, or an Apache MXNet framework.

Embodiments of the subject matter described in this specification can be implemented in a computing system that includes a back-end component, for example, as a data server, or that includes a middleware component, for example, an application server, or that includes a front-end component, for example, a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, for example, an HTML page, to a user device, for example, for purposes of displaying data to and receiving user input from a user interacting with the device, which acts as a client. Data generated at the user device, for example, a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described in this specification as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described in this specification should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   obtaining a plurality of de-blending training examples, wherein each de-blending training example defines: (i) one or more blended seismic traces, and (ii) for each blended seismic trace, a corresponding plurality of target unblended seismic traces, wherein:
   each blended seismic trace characterizes overlapping seismic signals due to seismic waves generated by a corresponding plurality of seismic sources, and
   each of the corresponding plurality of target unblended seismic traces characterizes a respective seismic signal due to seismic waves generated by a single seismic source of the corresponding plurality of seismic sources; and
   using the de-blending training examples to train a de-blending model having a plurality of de-blending model parameters, comprising, for each de-blending training example:
   processing the one or more blended seismic traces of the training example using the de-blending model to generate an output which defines, for each of the one or more blended seismic traces of the training example, a corresponding plurality of estimated unblended seismic traces; and adjusting values of the plurality of de-blending model parameters based on: (i) the target unblended seismic traces of the training example, and (ii) the estimated unblended seismic traces generated by the de-blending model by processing the blended seismic traces of the training example, comprising:

determining a similarity measure between the target unblended seismic traces of the training example and the estimated unblended seismic traces generated by the de-blending model by processing the blended seismic traces of the training example; and adjusting the values of the plurality of de-blending model parameters based at least in part on the similarity measure, comprising:

determining a gradient of a loss function that depends on the similarity measure; and using the gradient to adjust the values of the plurality of de-blending model parameters.

2. The method of claim 1, wherein obtaining the plurality of de-blending training examples comprises:
performing a geological survey of a geological region to acquire the target unblended seismic traces of each of the de-blending training examples.

3. The method of claim 2, further comprising, for one or more training examples:
generating the blended seismic traces of the training example by numerically blending the corresponding plurality of target unblended seismic traces of the training example.

4. The method of claim 1, wherein:
the blended seismic traces of each training example are represented as a blended shot record, and
the target unblended seismic traces of each training example are represented as respective target unblended shot records.

5. The method of claim 1, wherein each training example further comprises, for each blended seismic trace, data characterizing properties of the corresponding plurality of seismic sources.

6. The method of claim 5, wherein processing the one or more blended seismic traces of the training example using the de-blending model further comprises:
processing, for each blended seismic trace, the data characterizing the properties of the corresponding plurality of seismic sources using the de-blending model.

7. The method of claim 5, wherein the properties of the corresponding plurality of seismic sources comprise one or more of: respective activation strengths of each seismic source of the corresponding plurality of seismic sources, respective spatial positions of each seismic source of the corresponding plurality of seismic sources, and relative activation times of each seismic source of the corresponding plurality of seismic sources.

8. The method of claim 1, wherein the de-blending model comprises a neural network.

9. The method of claim 8, wherein the neural network is a convolutional neural network.

10. The method of claim 1, wherein:
the de-blending model is trained during a first portion of a geological survey that comprises obtaining the target unblended seismic traces of the plurality of de-blending training examples.

11. The method of claim 10, wherein:
training the de-blending model further comprises determining that a training termination criterion is satisfied; and
after the training termination criterion is satisfied, the geological survey acquires only blended seismic traces.

12. A system comprising:
one or more computers; and
one or more storage devices communicatively coupled to the one or more computers, wherein the one or more storage devices store instructions that, when executed by the one or more computers, cause the one or more computers to perform operations comprising:
obtaining a plurality of de-blending training examples, wherein each de-blending training example defines: (i) one or more blended seismic traces, and (ii) for each blended seismic trace, a corresponding plurality of target unblended seismic traces, wherein:
each blended seismic trace characterizes overlapping seismic signals due to seismic waves generated by a corresponding plurality of seismic sources, and
each of the corresponding plurality of target unblended seismic traces characterizes a respective seismic signal due to seismic waves generated by a single seismic source of the corresponding plurality of seismic sources; and
using the de-blending training examples to train a de-blending model having a plurality of de-blending model parameters, comprising, for each de-blending training example:
processing the one or more blended seismic traces of the training example using the de-blending model to generate an output which defines, for each of the one or more blended seismic traces of the training example, a corresponding plurality of estimated unblended seismic traces; and
adjusting values of the plurality of de-blending model parameters based on: (i) the target unblended seismic traces of the training example, and (ii) the estimated unblended seismic traces generated by the de-blending model by processing the blended seismic traces of the training example, comprising:
determining a similarity measure between the target unblended seismic traces of the training example and the estimated unblended seismic traces generated by the de-blending model by processing the blended seismic traces of the training example; and
adjusting the values of the plurality of de-blending model parameters based at least in part on the similarity measure, comprising:
determining a gradient of a loss function that depends on the similarity measure; and
using the gradient to adjust the values of the plurality of de-blending model parameters.

13. The system of claim 12, wherein obtaining the plurality of de-blending training examples comprises:
performing a geological survey of a geological region to acquire the target unblended seismic traces of each of the de-blending training examples.

14. The system of claim 13, wherein the operations further comprise, for one or more training examples:
generating the blended seismic traces of the training example by numerically blending the corresponding plurality of target unblended seismic traces of the training example.

15. The system of claim 12, wherein:
the blended seismic traces of each training example are represented as a blended shot record, and the target unblended seismic traces of each training example are represented as respective target unblended shot records.

16. One or more non-transitory computer storage media storing instructions that when executed by one or more computers cause the one or more computers to perform operations comprising:

obtaining a plurality of de-blending training examples, wherein each de-blending training example defines: (i) one or more blended seismic traces, and (ii) for each blended seismic trace, a corresponding plurality of target unblended seismic traces, wherein:

each blended seismic trace characterizes overlapping seismic signals due to seismic waves generated by a corresponding plurality of seismic sources, and each of the corresponding plurality of target unblended seismic traces characterizes a respective seismic signal due to seismic waves generated by a single seismic source of the corresponding plurality of seismic sources; and using the de-blending training examples to train a de-blending model having a plurality of de-blending model parameters, comprising, for each de-blending training example:

processing the one or more blended seismic traces of the training example using the de-blending model to generate an output which defines, for each of the one or more blended seismic traces of the training example, a corresponding plurality of estimated unblended seismic traces; and adjusting values of the plurality of de-blending model parameters based on: (i) the target unblended seismic traces of the training example, and (ii) the estimated unblended seismic traces generated by the de-blending model by processing the blended seismic traces of the training example, comprising:

determining a similarity measure between the target unblended seismic traces of the training example and the estimated unblended seismic traces generated by the de-blending model by processing the blended seismic traces of the training example; and adjusting the values of the plurality of de-blending model parameters based at least in part on the similarity measure, comprising:

determining a gradient of a loss function that depends on the similarity measure; and using the gradient to adjust the values of the plurality of de-blending model parameters.

17. The non-transitory computer storage media of claim 16, wherein obtaining the plurality of de-blending training examples comprises:

performing a geological survey of a geological region to acquire the target unblended seismic traces of each of the de-blending training examples.

18. The non-transitory computer storage media of claim 17, wherein the operations further comprise, for one or more training examples:

generating the blended seismic traces of the training example by numerically blending the corresponding plurality of target unblended seismic traces of the training example.

19. A method performed by one or more data processing apparatus, the method comprising:

obtaining a plurality of de-blending training examples, wherein each de-blending training example defines: (i) one or more blended seismic traces, and (ii) for each blended seismic trace, a corresponding plurality of target unblended seismic traces, wherein:

each blended seismic trace characterizes overlapping seismic signals due to seismic waves generated by a corresponding plurality of seismic sources, and each of the corresponding plurality of target unblended seismic traces characterizes a respective seismic signal due to seismic waves generated by a single seismic source of the corresponding plurality of seismic sources; and using the de-blending training examples to train a de-blending model having a plurality of de-blending model parameters, comprising, for each de-blending training example:

processing the one or more blended seismic traces of the training example using the de-blending model to generate an output which defines, for each of the one or more blended seismic traces of the training example, a corresponding plurality of estimated unblended seismic traces; and adjusting values of the plurality of de-blending model parameters based on: (i) the target unblended seismic traces of the training example, and (ii) the estimated unblended seismic traces generated by the de-blending model by processing the blended seismic traces of the training example;

wherein the de-blending model is trained during a first portion of a geological survey that comprises obtaining the target unblended seismic traces of the plurality of de-blending training examples;

wherein training the de-blending model further comprises determining that a training termination criterion is satisfied; and wherein after the training termination criterion is satisfied, the geological survey acquires only blended seismic traces.

* * * * *